Nov. 28, 1933.  S. J. SCHWEGLER  1,937,391
RADIOTIMER
Filed May 24, 1930    3 Sheets-Sheet 1

WITNESSES.
Frank T. Grace
Ella Hassler

INVENTOR.
Siegfried J. Schwegler
BY
Lucian B. Jackson
ATTORNEY.

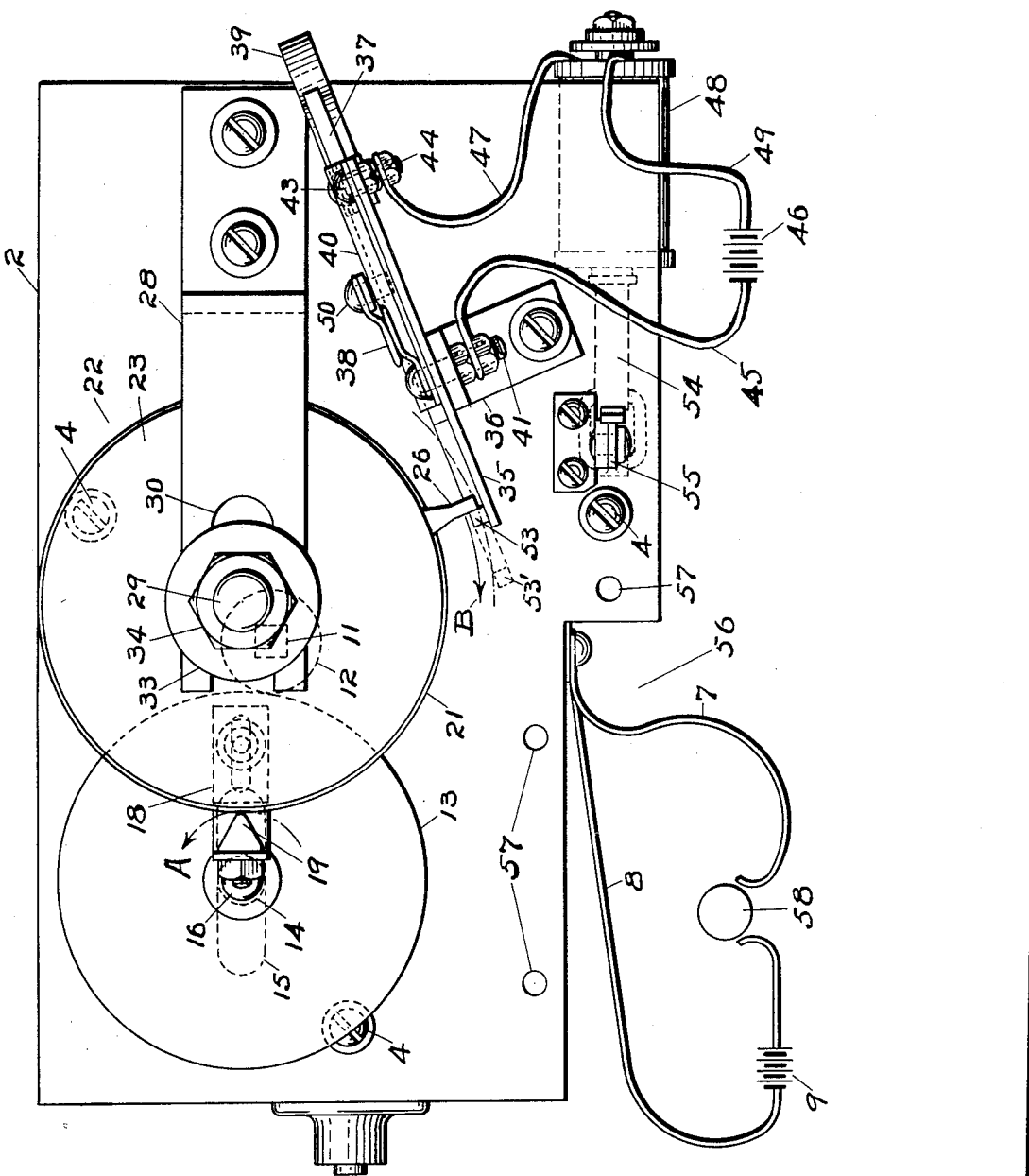

Nov. 28, 1933.　　　　S. J. SCHWEGLER　　　　1,937,391
RADIOTIMER
Filed May 24, 1930　　　3 Sheets-Sheet 3
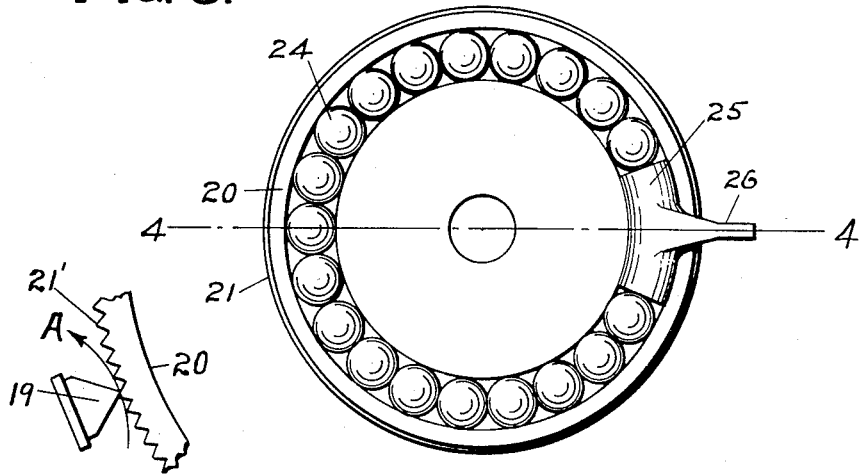
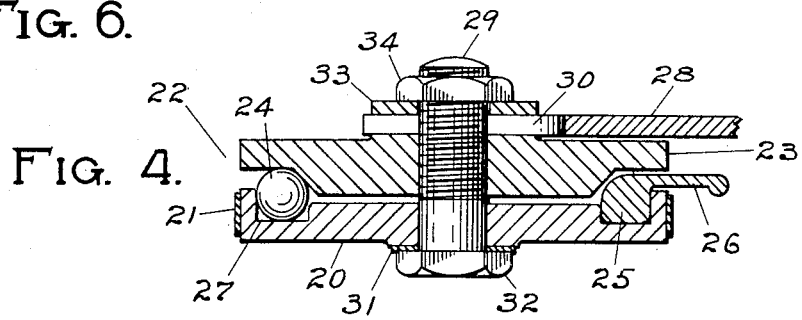
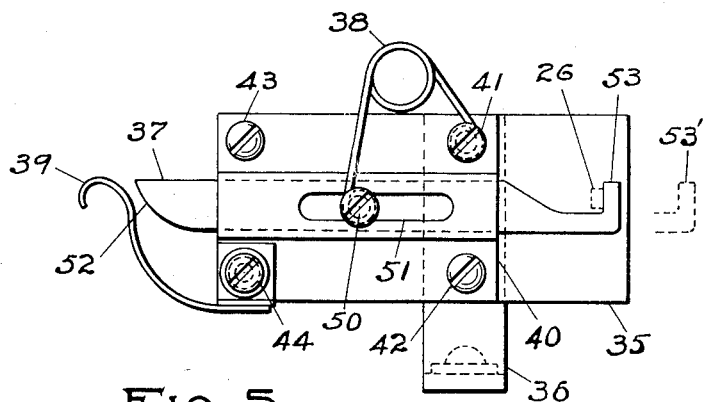
WITNESSES
Frank T. Grace
Ella Hassler
INVENTOR
Siegfried J. Schwegler
BY
Lucian Jackson
ATTORNEYS Patented Nov. 28, 1933

1,937,391

UNITED STATES PATENT OFFICE 1,937,391

RADIOTIMER

Siegfried J. Schwegler, Buffalo, N. Y.

Application May 24, 1930. Serial No. 455,312

6 Claims. (Cl. 161—1)

This invention relates to timers for use with a radio or other instrument which is started by the depositing of a coin and automatically stopped by said timer upon the completion of the amount of time paid for, and is used principally in conjunction with a prepayment meter.

An electric prepayment meter which is provided for the operation of an instrument as a player piano or talking machine, etc., operates to complete an electric circuit upon the passing through a chute between contacts of a deposited coin and so starts said instrument. Upon the completion of playing of the record paid for, a moving part of the instrument operates said prepayment meter to break an electric circuit and thus stop said playing instrument. In the case of a radio or similar instrument which has no moving part to operate a prepayment meter and which is operated according to the amount of time paid for, a timer, as the present invention, is provided for operating said prepayment meter and so stopping said instrument.

Reference is made to my patent on a prepayment meter, No. 1,833,724 Nov. 24, 1931, which can be operated by the present radio timer.

The principal object of the present invention is to provide a timer which is started by the passing between contacts of a deposited coin to operate a prepayment meter and which at the end of the time paid for, effects the operation of said meter to stop the instrument to which said meter is connected.

With this object in view, the invention consists in certain features of novelty in the construction, combination and arrangement of parts by which the said object and certain other objects which will hereinafter appear are attained, the invention being more particularly pointed out in the claims.

In the drawings accompanying and forming a part of this specification,

Fig. 2 is a plan of the timer shown in Fig. 1.

Fig. 3 is a plan of the ball cup with the top cone removed and showing the balls in their race and the block with finger which travels with the balls.

Fig. 4 is a sectional elevation of the ball bearing on line 4—4 of Fig. 3 with the ball bearing assembled as in Figs. 1 and 2.

Fig. 5 is an elevation of the slide switch operated by the finger projecting from the block in the ball race.

Fig. 6 is a form of cup with teeth to engage the driving wedge.

Figure 1:
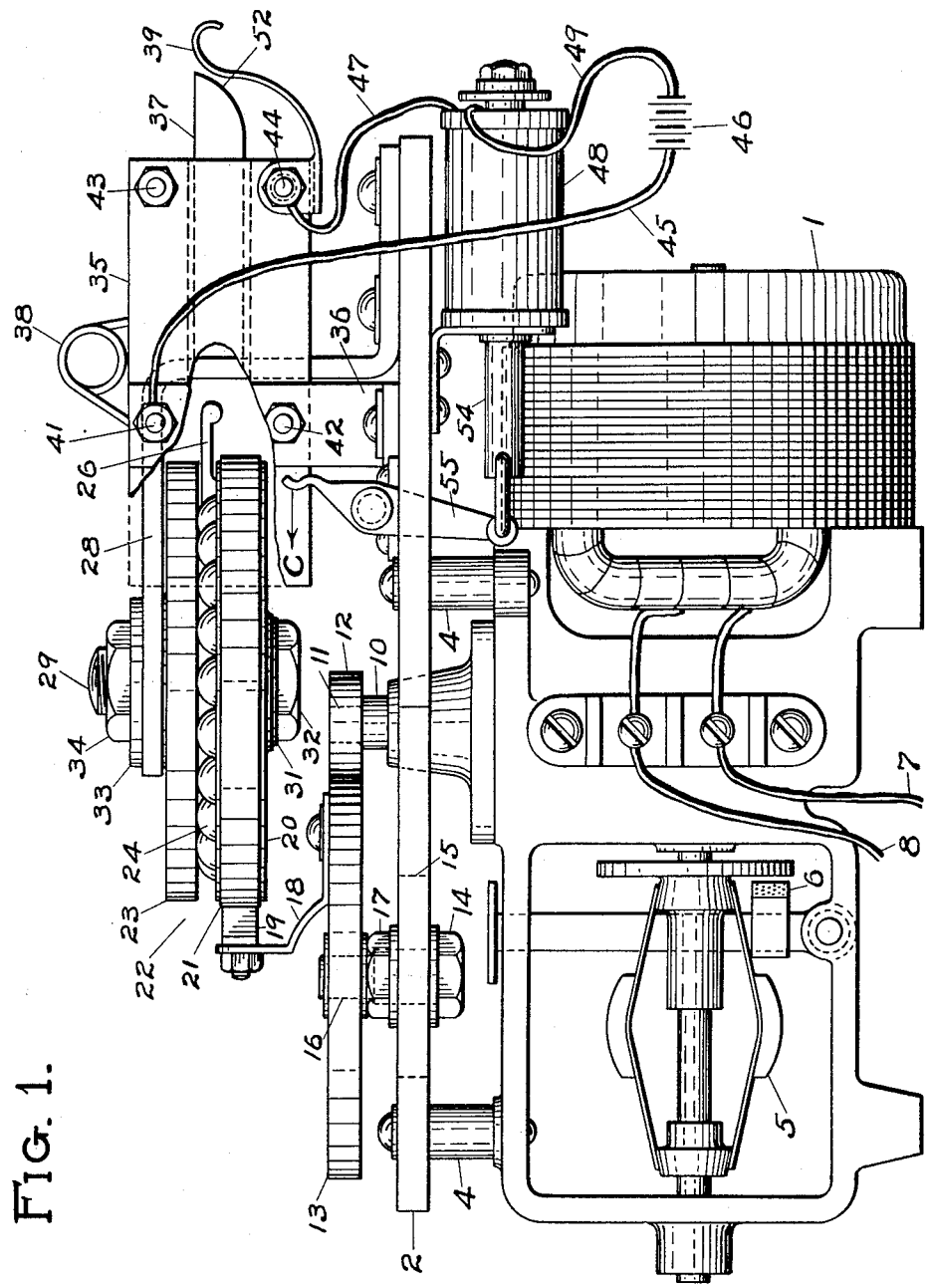
Figure 1 is a side elevation of a radio timer made in accordance with this invention.

In the form of my invention illustrated, an electric induction motor 1 is provided, upon which is mounted a platform 2 supported by three legs 4. The motor 1 has a governor 5 to maintain a constant speed and a brake 6 for controlling said speed. 7 and 8 are conducting wires to form an electric circuit between said motor 1 and a source of power as a battery 9 in Fig. 2.

10 is a vertical shaft driven by motor 1 and having a squared end 11 for driving pinion 12 in frictional contact with the idler 13. 14 is a stud projecting up through a slot 15 in platform 2 and furnishing a bearing 16 on the upper end for rotatively mounting the idler 13. Stud 14 is fastened in the platform 2 by a nut 17. Slot 15 furnishes a means of adjusting idler 13 against pinion 12 and allows for a different sized pinion 12 and idler 13 for changing the speed of rotation of said 13. 12 and 13 are disassembled by simply lifting them from 11 and 16 respectively.

Fastened on idler 13 is an adjustable bracket 18 carrying a wedge 19 for making a line contact with, and moving cup 20 a short distance at every rotation of said idler 13. 21 is a rubber ring around cup 20 as a means of making driving contact with wedge 19 and with more or less motion of cup 20 at each contact, depending upon the depth wedge 19 sinks into said ring 21. Teeth 21' (Fig. 6) as a means of driving cup 20 consumes less power but is not as silent as rubber 21. The direction of motion of idler 13 and the wedge 19 is shown by the arrow A.

22 is a ball bearing consisting of a cone 23 and a cup 20 having a race 27 with a row of balls 24 and a sliding block 25, said block 25 with a finger 26 projecting outward through the opening between the said cup 20 and cone 23. The ball race 27 in the cup 20 has a square section, i. e. the bottom is horizontal and the two sides rise vertically at right angles to said bottom to give a two point bearing for the balls 24 but a three sided bearing for the sliding block 25.

28 is a Z-shaped bracket fastened as shown to the platform 2 for supporting the ball bearing 22 by means of a bolt 29 threaded through the cone 23 and extending through a slot 30 in said bracket 28. The cup 20 rests on a bearing washer 31 under the head 32 of said bolt 29 and is free to rotate on said bolt 29. 33 is a washer and 34 a nut on bolt 29 for clamping the cone 23 to the bracket 28. Adjustment of the ball bearing 22 is effected by turning the cone 23 on the threads of the bolt 29 and locking it by tightening the nut 34 to clamp the bearing 22 to the bracket 28. The slot 30 is for the purpose of assembly and adjustment of contact of the ring 21 and the wedge 19.

A switch to be operated at each revolution of the row of balls 24 and the block 25, by the finger 26 consists of a panel 35 supported by a bracket 36 mounted on the platform 2; a slide 37 mounted on panel 35 and controlled by the spring 38; and a contact spring 39 for completing an electric circuit when in contact with said slide 37. 40 is a cover to mount slide 37 on panel 35 and fastened to said panel 35 by means of bolts 41, 42, 43 and 44. Bolts 41 and 42 fasten panel 35 to bracket 36 and bolt 41 holds one end of spring 38 and also acts as a binding post for the wire 45 in an electric circuit to a source of power represented by the battery 46. Bolt 44 fastens contact spring 39 to panel 35 and acts as a binding post between the said 39 and the wire 47 which is connected to a solenoid 48. 49 is a wire from solenoid 48 to battery 46. The bolt 44 and contact spring 39 are insulated from the panel 35. Spring 38 is connected to the slide 37 by means of a screw 50 passing through the slot 51 in cover 40, and holds said slide 37 normally out of contact with contact spring 39 and in the position as shown in Fig. 5.

52 is a beveled or curved end of slide 37 for making a sliding or wiping contact with contact spring 39 while the opposite end is cut away to form a hook 53 against which the finger 26 strikes to move it from 53 to 53' in the direction of the arrow B (Fig. 2).

The solenoid 48 has a plunger 54 for operating a lever 55, the upper end of which, moving in the direction of arrow C, is adapted to stop the playing of the instrument to which it is connected, as by the breaking of an electric circuit in my prepayment meter above referred to. The platform 2 is cut out at the corner indicated by 56 to accommodate my prepayment meter and fastened thereto by use of the three holes 57.

In the electric circuit represented by the conducting wires 7 and 8 and the battery 9 is shown a ball 58 for completing said circuit to start the motor 1 and represents my prepayment meter which is not otherwise shown and which is operated by the depositing of a coin. Motor 1 rotates the shaft 10 and pinion 12 which in turn by friction contact rotates the idler 13 with its wedge 19 for contacting with the ring 21 on cup 20 or with teeth 21' if so provided. At each rotation of idler 13 the wedge 19 moves the cup 20 a short distance and with it its contained row of balls 24 and the sliding block 25 with projecting finger 26. The row of balls 24 bearing against the stationary cone 23 make a complete revolution around said cone 23 at less speed and consequently consume more time than the cup 20 in making a complete rotation on its axis and serves as a means of reduction of speed of the block 25 which travels with said row of balls 24. The friction of the block 25 sliding in ball race 27 holds the cup 20 stationary when not propelled by the wedge 19.

At each complete revolution of finger 26 it contacts with the hook 53 of the slide 37 and moves it by small increments of distance at a time until it reaches a position 53' when it slips off from said hook 53 and under impulse of the spring 38 the slide 37 is then snapped back until its end 52 contacts with spring 39 to complete the circuit through battery 46 and energize solenoid 48 to move lever 55 and operate my prepayment meter by breaking its circuit and so stop the playing of a radio to which it may be connected. After slide 37 wipes over contact spring 39 the connection is broken by spring 38 returning said slide 37 to its normal position shown in Fig. 5.

It will be understood that this timer may be used with apparatus to which it may be applicable other than with my prepayment meter.

The method of construction of my timer, frictional operation with its quietness and allowance for smaller increments of adjustment of speed than by gearing, and absence of clock arrangement for timing all contribute to its simplicity and effectiveness.

What I claim as new and desire to secure by Letters Patent is:

1. A radio timer having in combination with an induction motor, a pinion on said motor, an idler in frictional contact with said pinion, a ball bearing consisting of a stationary cone, a rotating cup, a row of balls in a race in said cup adapted to revolve in contact with said cone, a block adapted to slide in said ball race and move with said balls, a finger on said block projecting from said ball bearing, a wedge on said idler to contact with a tooth on said cup once in each rotation of said idler to move said cup a short distance at each of said contacts, and a switch including a movable circuit making and breaking member adapted to be operated by said finger.

2. A radio timer having in combination with a motor, an idler, means to frictionally drive said idler from said motor, a ball bearing consisting of a stationary cone, a rotating cup, balls in a race in said cup, a block adapted to slide in said ball race and move with said balls, a finger on said block projecting from said ball bearing, means on said idler for contacting with and moving said cup a short distance once in each rotation of said idler, and a switch including a movable member for making and breaking a circuit and adapted to be operated by said finger.

3. A radio timer having in combination with a motor, a ball bearing having a stationary and a rotating member, a row of balls bearing on said stationary and rotating members and adapted to revolve around said stationary member at a slower speed than the rotation of said movable member, a sliding block moving with said row of balls, means to frictionally operate said moving member from said motor, and a switch, said switch adapted to make contact with and be operated by said sliding block.

4. In a radio timer, a switch and an operating member for said switch, said operating member consisting of a stationary cone, a rotating cup, a row of revolving members bearing between said cup and cone, a sliding block in said cup and travelling with said revolving members, said switch including a flexible contact, a slide to make wiping connection with said flexible contact, a spring to control said slide and hold it normally out of connection with said flexible contact and a hook on said slide whereby the block of said operating member may engage and operate said switch.

5. A radio timer having in combination with a motor, a pinion on said motor, an idler in adjustable frictional contact with said pinion, a reduction speed bearing consisting of a stationary cone, a rotating cup, rolling members adapted to bear between said cup and cone, a sliding member travelling with said rolling members, a finger on said sliding member, a member on said idler to contact with and move said cup a short distance at each rotation of said idler and adapted for adjustment of contact with said cup, and a switch, said switch adapted to be operated by said finger.

6. A radio timer having in combination with a motor, a switch, speed reduction means in said timer including a rotating cup, rolling members carried by said cup and means moved by said rolling members at a less speed than said cup to operate said switch.

SIEGFRIED J. SCHWEGLER.